United States Patent [19]

Hanna

[11] Patent Number: 4,608,726
[45] Date of Patent: Sep. 2, 1986

[54] WRAPAROUND BRUSH

[76] Inventor: Daniel C. Hanna, 1133 SW. Rivington Dr., Portland, Oreg. 97201

[21] Appl. No.: 689,865

[22] Filed: Jan. 9, 1985

[51] Int. Cl.$^4$ ............................................. B60S 3/06
[52] U.S. Cl. .............................. 15/53 AB; 15/DIG. 2
[58] Field of Search ............ 15/53 A, 53 AB, DIG. 2

[56] References Cited

U.S. PATENT DOCUMENTS

| | | | |
|---|---|---|---|
| 3,350,733 | 11/1967 | Hanna | 15/53 AB |
| 3,428,982 | 2/1969 | Beer | 15/53 AB |
| 3,772,724 | 11/1973 | Wilson | 15/53 AB |
| 4,441,226 | 4/1984 | Hanna | 15/53 AB |

OTHER PUBLICATIONS

Hanna Industries Drwg. No. 610,507; dated 8-10-81.

*Primary Examiner*—Edward L. Roberts
*Attorney, Agent, or Firm*—Klarquist, Sparkman, Campbell, Leigh & Whinston

[57] ABSTRACT

A wraparound brushing device includes a U-shaped brush-supporting arm which facilitates use of wraparound brushing devices in automatic vehicle washing facilities having limited space. The U-shaped brush-supporting arm typically includes two legs at right angles to one another.

8 Claims, 3 Drawing Figures

FIG. 1
FIG. 2
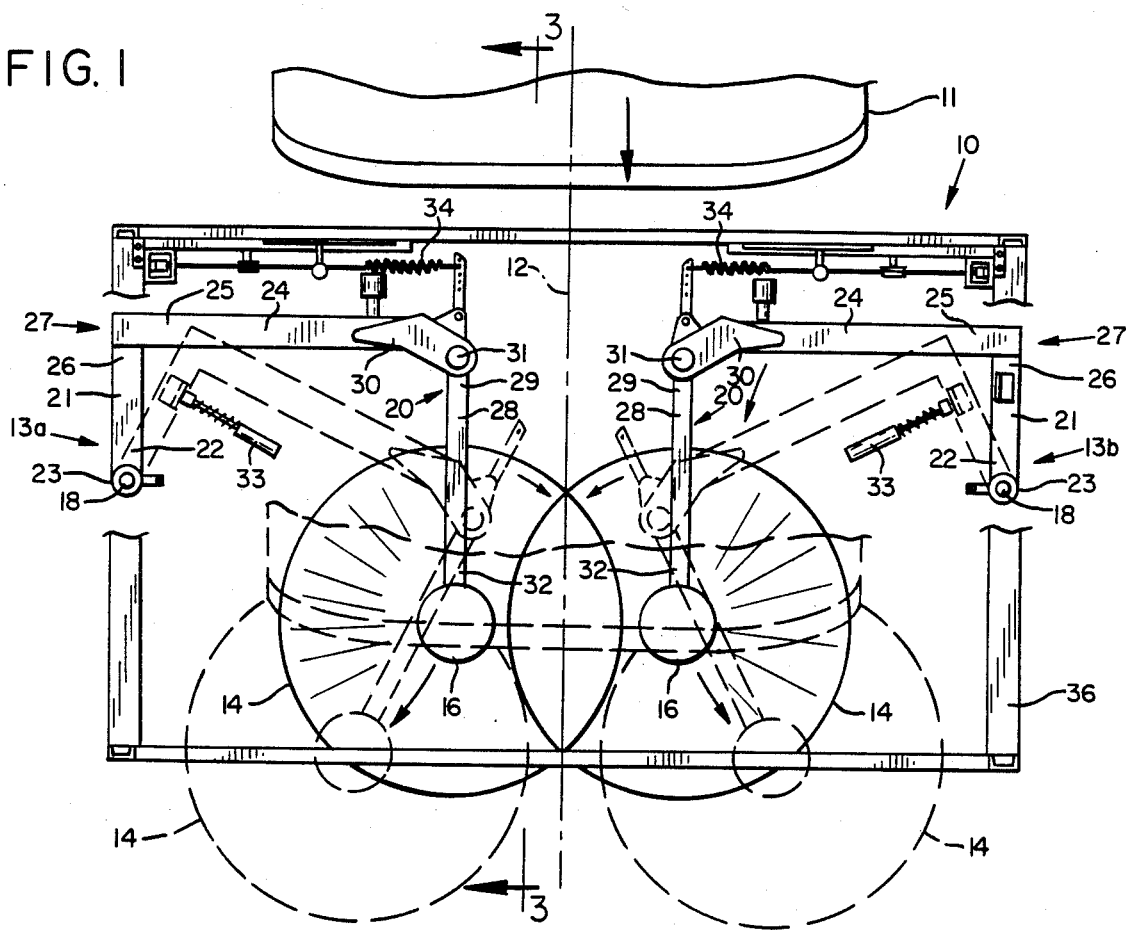
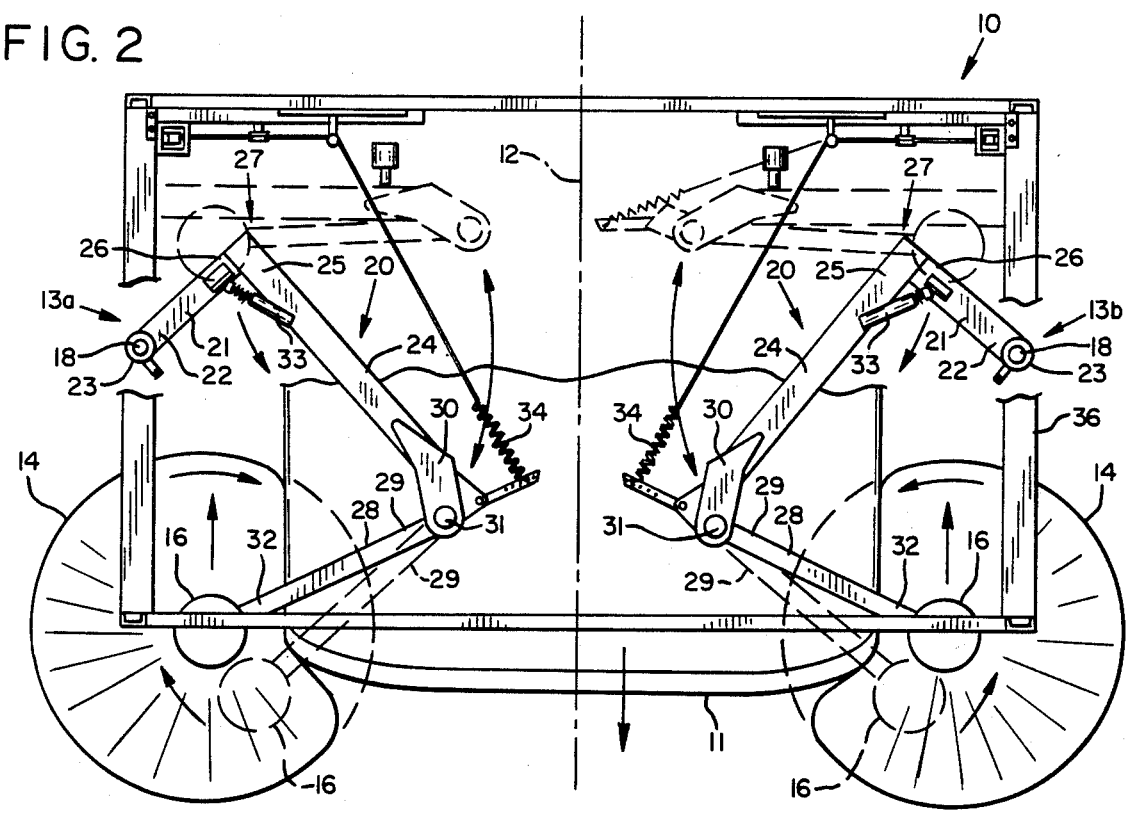

1

WRAPAROUND BRUSH

BACKGROUND OF THE INVENTION

This invention relates to wraparound brushing devices, and more particularly to compact wraparound brushing devices.

Wraparound brushes are used in automatic car-washing facilities to wash the front, sides, and back of a car as it is advanced along a central track. U.S. Pat. No. 3,350,733 illustrates such a brush. Not all automatic car-washing facilities, however, have been able to incorporate wraparound brushing devices because of space constraints. Wraparound brushes known in the prior art extend, during operation, over a lengthy section of the central track. The size of car-washing facilities employing wraparound brushes is therefore greater than the size of similar car-washing facilities using conventional brushes. This has heretofore limited the applicability of wraparound brushes to applications where space is not at a premium.

SUMMARY OF THE INVENTION

It is an object of the present invention to provide a compact wraparound brush.

It is a further object of the present invention to provide a wraparound brush that can operate in a small space.

It is yet a further object of the present invention to provide a compact wraparound brush that has the same range of longitudinal travel across the front and rear ends of a vehicle as larger prior art wraparound brushes.

A complete understanding of the invention may be obtained from the following detailed description of improved wraparound brush devices when read in conjunction with the appended drawings, in which:

BRIEF DESCRIPTION OF DRAWINGS

FIG. 1 is a top plan view of a car-washing device forming one embodiment of the invention;

FIG. 2 is a top plan view of a car-washing device forming one embodiment of the invention in which an advancing vehicle has engaged the brush.

DETAILED DESCRIPTION OF A PREFERRED EMBODIMENT

Figure 3:
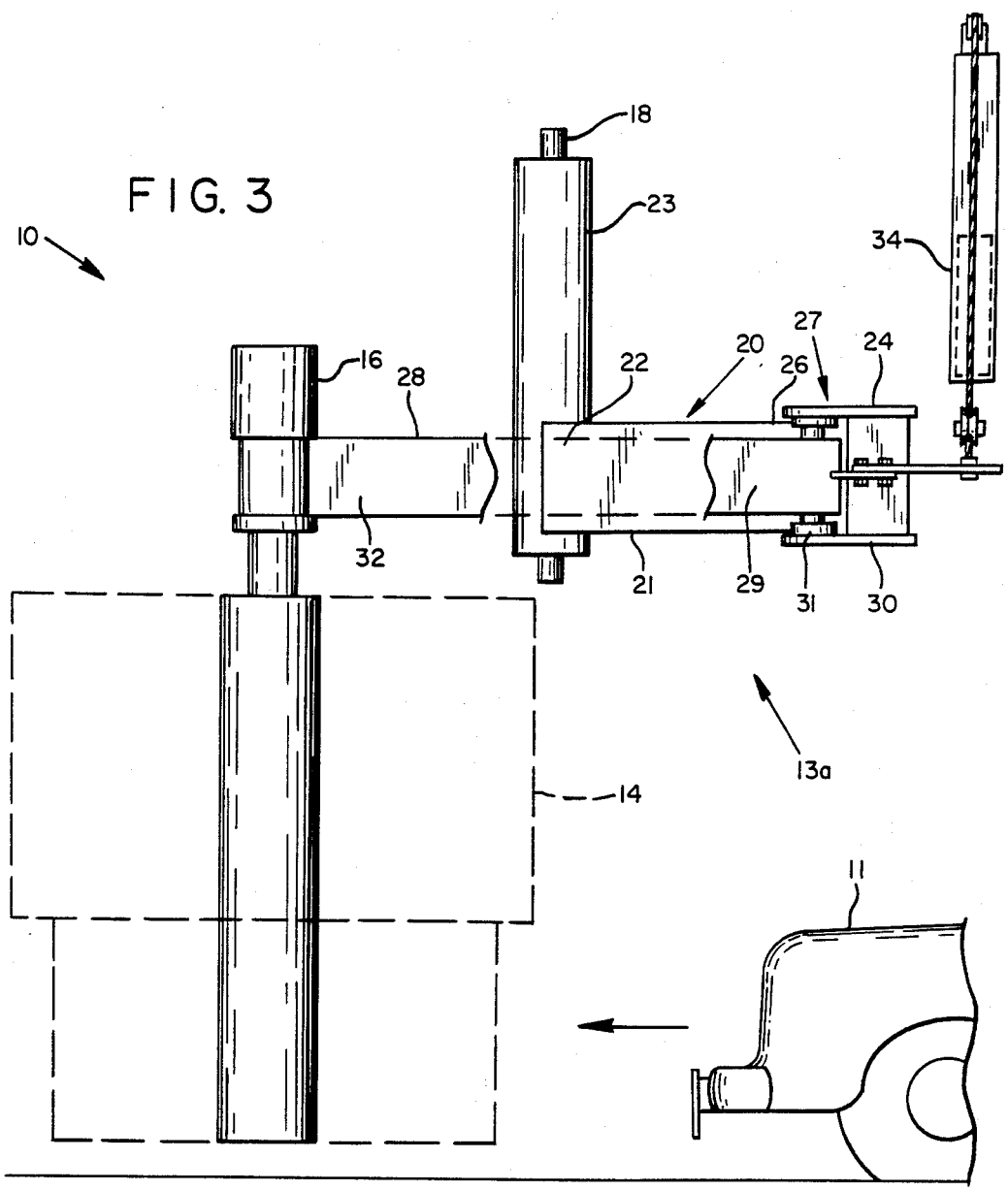
FIG. 3 is a side elevation view of the car-washing device of FIG. 1.

Referring now in detail to FIGS. 1 and 2, an apparatus for washing vehicles is shown generally as 10. The apparatus washes a vehicle 11 advancing along a path 12 in the direction indicated by the arrow. A typical installation includes two wraparound brushes 13a and 13b mounted on opposite sides of the vehicle path. Alternatively, brushes 13a, 13b may be staggered longitudinally along the vehicle path.

The wraparound brush of the present invention includes a brush 14 and a motor 16 for rotating the brush. On one side of the vehicle path is a support 18. Pivotally mounted to support 18 are brush-supporting or mounting means in the form of an arm 20. Arm 20 is positioned above the vehicle path to allow vehicles to pass beneath the arm. Arm 20 has a U-shaped configuration when the arm is in an initial or first position.

Arm 20 includes an inboard leg or first leg section 21 pivoted at its first end 22 at support 18 by a pivot 23. In the first position, leg 21 extends in a rearward direction from support 18, parallel to and along the side of vehicle path 12. Inboard leg 21 is preferably straight.

Arm 20 has a central member or second leg section 24. A first end 25 of central member 24 is rigidly connected to a second end 26 of inboard leg 21. Central member 24 and inboard leg 21 are preferably normal to one another, whereby central member 24 extends normal to the forward direction of the vehicle path. In this position, central member 24 extends, at least partially, across the vehicle path and over its central region.

Inboard leg 21 and central member 24 may be thought of as forming the first and second leg sections of an L-shaped primary arm 27. An outboard leg or secondary arm 28 of arm 20 has a first end portion 29 pivotally connected to the second end portion 30 of central member 24 at a pivot 31, so as to permit pivoting of outboard leg 28 toward central member 24. End 30 of central member 24, to which outboard leg 28 is pivoted, is preferably curved forwardly. Outboard leg 28 is preferably straight. End 30 of outboard leg 28 extends along vehicle path 12 forwardly of central member 24 when arm 20 is in the first position.

Motor 16 for rotating brush 14 is mounted on a second end portion 32 of outboard leg 28. Brush 14 is rotatably connected to and supported beneath end 32 of outboard leg 28. Arm 20 holds brush 14 in engagement with advancing vehicle 11 throughout the vehicle-washing cycle. This engagement, in cooperation with the reaction of advancing vehicle 11 on rotating brush 14, causes brush 14 to move along the front, side and rear of the vehicle. In particular, when engaged by advancing vehicle 11, brush 14 initially moves away from the first position, forwardly along and transversely across the front of the vehicle. Brush 14 thus follows an arc-shaped path until it reaches the side of vehicle path 12, adjacent support 18. Brush 14 in this position is shown in FIG. 2. A primary arm over travel stop 33 prevents inboard leg 21, and consequently primary arm 27, from traveling beyond a certain position.

Referring to FIG. 2, arm 20 next permits brush 14 to continue to travel along, and in engagement with, the side of vehicle 11 until it reaches the rear section of the vehicle. While brush 14 engages the side of vehicle 11, it is urged against the vehicle with sufficient force, and is rotated with sufficient force, to move primary arm 27 to the first position and to move outboard leg 28 to a folded position. Upon reaching the rear end of vehicle 11, the outboard leg 28 is folded back toward central member 24.

The rear end of vehicle 11 is brushed as arm 20 moves brush 14 forwardly with and transversely across the rear end of advancing vehicle 11, thereby completing the cycle.

Apparatus 10 includes a positioning device 34 for urging arm 20 to the first position. Positioning device 34 is preferably a tension spring or counterweight system coupled to outboard leg 28. In the illustrated embodiment, wraparound brush 13a is installed in a metal frame 36, to which positioning device 34 and support 18 are coupled.

Having described and illustrated the principles of my invention in a preferred embodiment, it should be apparent to those skilled in the art that the invention may be modified in arrangement and detail without departing from such principles.

I claim all modifications coming within the scope and spirit of the following claims:

1. An apparatus for washing vehicles advancing in a forward direction along a path comprising:

a brush;

means for rotating the brush;

support means positioned to one side of the path;

brush supporting arm means mounted to the support means and positioned above the path so as to allow vehicles to pass beneath the arm means, the arm means having an L-shaped primary arm with first and second leg sections each with respective first and second end portions, the second end portion of the first leg section being connected to the first end portion of the second leg section to form the primary arm, the primary arm defining a corner region between and near the connection of the first and second leg sections;

the first end portion of the first leg section being pivoted to the support means, the arm means also including a secondary arm having first and second end portions, the first end portion of the secondary arm being pivoted to the second end portion of the second leg section of the primary arm, and the brush being rotatably connected to the second end portion of the secondary arm;

the arm means being positionable in a first postion in which the first leg section extends in a rearward direction from the support means and along the side of the path, the second leg section extends at least partially across the path, and in which the secondary arm supports the brush for engagement with the front of a vehicle advancing in the forward direction along the path, whereby, in cooperation with the reaction of the car on the rotating brush, the brush is movable from engagement with the front of an advancing vehicle when the arm means is in the first position, across the front end of the vehicle to the side of the vehicle adjacent the support means, along the side of the vehicle into engagement with the rear of the vehicle and across the rear of the vehicle, whereby the brush extends to a rearward position that is disposed rearwardly virtually as far as the rearmost portion of the brush supporting arm means, thereby maximizing the brush's length of travel with the vehicle; and positioning means for urging the arm means toward the first position.

2. A vehicle washing apparatus according to claim 1 in which the second end of the second leg section is curved forwardly, whereby the secondary arm can fold back a greater rearward distance into the corner region.

3. A vehicle washing apparatus according to claim 2 in which the first leg section and secondary arm are straight.

4. A vehicle washing apparatus according to claim 1 in which the first and second leg sections are normal to one another, and in which, when the arm means is in the first position, the first leg section is positioned parallel to the path and extends rearwardly in a direction opposite the forward direction, and the second leg section extends normal to the forward direction.

5. An apparatus for washing vehicles advancing forwardly along a path comprising:

a rotary brush;

means for rotating the brush;

support means positioned to one side of the path;

brush mounting means for supporting and holding the brush against a front end of a vehicle which is advanced forwardly along the path, the brush mounting means permitting movement of the brush forwardly with the forward movement of the vehicle along the path and transversely across the front of the advancing vehicle to a side of the vehicle, the brush mounting means also holding the brush in engagement with the side of the vehicle while the vehicle is advanced, the brush mounting means permitting movement of the brush from the side of the vehicle and into engagement with the rear of the vehicle as the vehicle is advanced, and the brush mounting means moving forwardly with the vehicle and transversely across the rear end of the vehicle as the vehicle is advanced;

the brush mounting means including primary and secondary arms, the primary arm having first and second arm sections which are joined perpendicularly to one another, said first and second arm sections defining a corner region near and between the junction of said sections, the primary arm being pivoted to the support means at one end of the first arm section such that, when the primary arm is in a first position, the outer end of the second arm section is positioned over a central region of the path and, as the primary arm pivots from this first position, the outer end of the second arm section travels forwardly in an arc across the path of the vehicle, the secondary arm having a first end pivotally mounted to the outer end of the second arm section and a second free end, the secondary arm being movable from a first position projecting outwardly from the second arm section and extending in a forward direction along the vehicle path to positions in which the secondary arm is folded into the corner region, whereby the brush can extend to a rearward position that is disposed rearwardly virtually as far as the rearmost portion of the brush mounting means, thereby maximizing the brush's length of travel with the vehicle;

means mounting the brush to the free end of the secondary arm; and positioning means for urging the primary and secondary arms to their first positions.

6. A vehicle washing apparatus according to claim 5 wherein the positioning means comprises a tension spring means connected to the secondary arm.

7. A vehicle washing apparatus according to claim 5 wherein the means for rotating the brush rotates the brush in the direction in which the reaction of the vehicle on the brush tends to move the brush first across the front end to the side of a vehicle advancing along the path, then back along the side of the vehicle and then across the rear end of the vehicle from the side thereof, and wherein the brush is urged against the side of the vehicle with sufficient force and is rotated with sufficient force to move the primary arm to its first position and the secondary arm to a folded position while the brush engages the side of the vehicle.

8. A vehicle washing apparatus according to claim 5 in which the outer end of the second arm section is curved so as to extend forwardly when the primary arm is in the first position, whereby the secondary arm can fold back a greater rearward distance into the corner region.

* * * * *